US006409151B1

(12) United States Patent
Cormier

(10) Patent No.: US 6,409,151 B1
(45) Date of Patent: Jun. 25, 2002

(54) MECHANICAL JACK

(76) Inventor: Paul L. Cormier, P.O. Box 61, Spencer, MA (US) 01562

( * ) Notice: Subject to any disclaimer, the term of this patent is extended or adjusted under 35 U.S.C. 154(b) by 0 days.

(21) Appl. No.: 09/942,229

(22) Filed: Aug. 29, 2001

(51) Int. Cl.[7] .................................................. B60P 1/48

(52) U.S. Cl. ................ 254/8 R; 254/131; 254/DIG. 1; 254/DIG. 4; 254/134; 254/119

(58) Field of Search ................................ 254/8 R, 131, 254/121, 120, 133 R, 9 R, 9 B, 8 B, 134, 113, 119, DIG. 1, DIG. 4

(56) References Cited

U.S. PATENT DOCUMENTS

| | | | | |
|---|---|---|---|---|
| 1,511,801 A | * 10/1924 | Coochran | .................. | 254/8 R |
| 4,127,255 A | 11/1978 | Wooding | | |
| 4,205,825 A | 6/1980 | Stanford | | |
| 5,335,923 A | 8/1994 | Langenback et al. | | |
| 5,713,557 A | * 2/1998 | Kang | ........................ | 154/9 B |
| 5,826,857 A | * 10/1998 | Brack et al. | ................ | 254/8 R |

* cited by examiner

*Primary Examiner*—Joseph J. Hail, III
*Assistant Examiner*—Lee Wilson
(74) *Attorney, Agent, or Firm*—Joseph R. Birkner

(57) ABSTRACT

A mechanical jack for lifting an object including a lever, a base and a fulcrum disposed between the lever and the base and a post for supporting the object being lifted with the post pivotally attached to the lever and a rod movably disposed between the post and the lever and the post cooperating with the lever, the base and the fulcrum is disclosed. The mechanical jack lifts and supports a wide variety of objects including, but not limited to, a snow plow blade, a sofa, a desk, a small building, a boat, a snowmobile, an aircraft, a filing cabinet, a stove, a table and other such loads. An additional feature of the mechanical jack includes a cup member disposed near a second end of the lever which faciliates lifting objects which are inconvenient or difficult to lift. Another feature of the mechanical jack includes a clasp disposed near the first end of the lever for use for assisting in the attachment of an object such as a snow plow blade to a "V" plate mounted on a vehicle. Although the mechanical jack can operate without the need for height adjustment; however, preferably, to make the mechanical jack even more functional, a vertical height of the fulcrum and of the post may be independently adjusted.

22 Claims, 6 Drawing Sheets

MECHANICAL JACK

FIELD OF THE INVENTION

This invention relates generally to mechanical jacks. More particularly, the present invention relates to a mechanical jack for use with lifting and for supporting a wide variety of objects.

BACKGROUND OF THE INVENTION

Typically, mechanical jacks are designed for a specific application such as a bumper jack for lifting an automobile, a house jack, a floor jack and others. Such jacks can not be used for different applications other than their intended use for which they were specifically designed. A problem is that if a need for lifting a snow plow blade, a sofa, a desk, a small building, a boat, a snowmobile, an aircraft, a filing cabinet, a stove, a table and other such loads, the user must attempt to locate a specialized mechanical jack for the specific job. This is frustrating since there is no universal mechanical jack which can do several lifting chores. Furthermore, if there were multi-use jacks and even specialty jacks available, the purchase cost would be prohibitive.

A practical mechanical jack, for which there is an unfulfilled need, wherein the mechanical jack capable of being selectively usable for a wide range of lifting applications, is not available.

U.S. Pat. No. 4,205,825 to Stanford shows a jack for snow plow frames. A disadvantage of this patent is that it is bulky, which inherently contributes to its weight, and that it can not be used for lifting objects other than the snow plow frame for which it was specifically designed. Also, the screw component of the jack may be subjected to road sand and salt which could contaminate and possibly jam the screw mechanism making it difficult to crank when in use or rendering it inoperable. Also, no provision on the jack is provided for positioning and for aligning the hoist mounted on the truck with the snow plow. Furthermore, the design is costly.

U.S. Pat. No. 5,335,923 to Langenback et al discloses a snow plow dolly. A problem with this design is that it is specifically adapted to and structurally limited to use for a snow plow blade and can not be practically used to lift and support any other objects. Also, the design is bulky and relies on a jack device in the form of a screw for operation which may be susceptible to road sand and salt which could make it difficult or impossible to operate.

U.S. Pat. No. 4,127,255 to Wooding shows a leverage device for use with a jack which relies on a scissoring leveraging action for raising and lowering an object when the jack is activated. A disadvantage of this device is that it requires a relatively large rectangular frame structure that is interengaged with a lever means with removable bars making it cumbersome to use and expensive to fabricate.

None of the above prior art devices disclose a mechanical jack which has a lever lifting portion and a supporting portion which cooperate with each other without the need for screw or scissor type mechanisms or bulky structural frames and a mechanical jack which is simple in a design and is easy to use.

In view of the above mentioned problems and limitations associated with conventional lifting mechanisms, it was recognized by the present inventor that there is an unfulfilled need for an improved mechanical jack which is simple in design, practical, fun to use and is economically manufactured and which overcomes the disadvantages of the prior art devices.

SUMMARY OF THE INVENTION

It is therefore an object of this invention to provide a new and improved mechanical jack which is conveniently usable for lifting a wide variety of loads which avoids the aforementioned problems of prior art devices.

It is an object of the instant invention to provide a mechanical jack which may be manufactured from readily available materials by conventional manufacturing processes.

It is a further object of this invention to provide a mechanical jack that is simple in design, simple to manufacture, low in cost and fun to use.

It is another object of this invention to provide a mechanical jack which provides a lever lifting means for lifting an object and a supporting means for supporting the lifted object which cooperate with each other.

It is a still a further object of this invention to provide a mechanical jack which can be used to lift and support various objects such as, but not limited to, a snow plow blade, a boat, a sofa, a desk, a small building, a snowmobile, an aircraft, a filing cabinet, a stove, a table and other such loads.

Further objects will become apparent from the following description and claims.

This invention results from the realization that there is a great need for an improved mechanical jack. The resulting invention provides a user the capability of conveniently being able to lift a wide variety of loads without the need to purchase separate jacks for each intended purpose.

The above and the other objects are achieved in accordance with the present invention, which, according to a first aspect, provides a mechanical jack which has a lifting means for lifting an object including a lever, a base and a fulcrum disposed between the lever and the base and a supporting means for supporting the object being lifted including a post pivotally attached to the lever and a rod movably disposed between the post and the lever and the supporting means cooperating with the lifting means.

The second aspect is a special case of the.first aspect of this invention with additional features such as a cup member disposed near the second end of the lever which facillates lifting objects which are inconvenient or difficult to lift. Another feature of the mechanical jack is that a clasp may be disposed near the first end of the lever for use for assisting in the attachment of an object such as a snow plow blade to a "V" plate mounted on a vehicle. Although the mechanical jack can operate without the need for height adjustment; however, preferably, to make the mechanical jack even more functional, height adjusting means for independently adjusting a vertical height of the fulcrum and the post is provided.

According to a third aspect of the invention, disclosed is a method for making a mechanical jack.

According to a fourth aspect of the invention, disclosed is a method for using a mechanical jack.

DETAILED DESCRIPTION OF PREFERRED EMBODIMENTS

Figures 1, 1A:
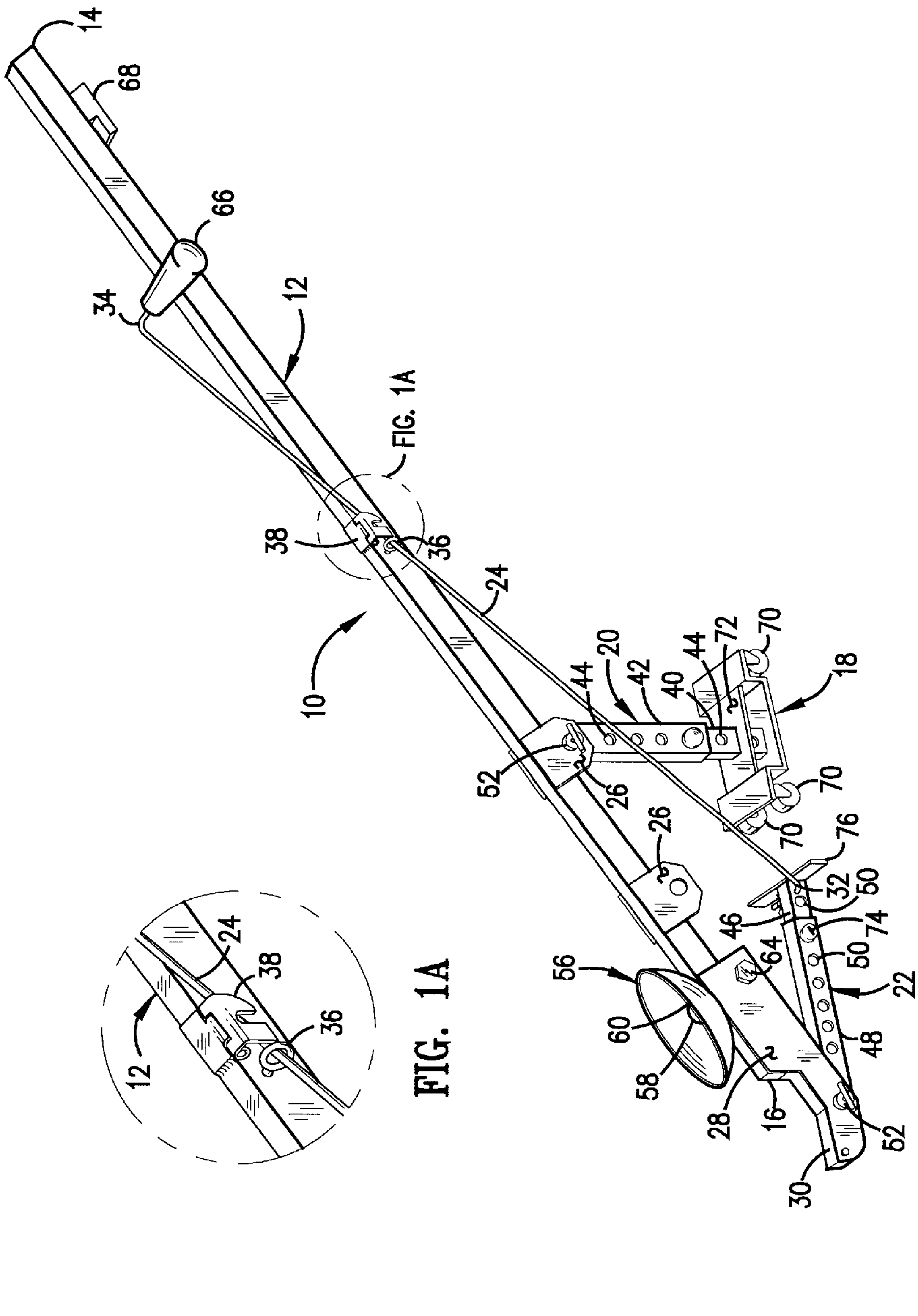
FIG. 1 is a right side perspective view of a preferred embodiment of a mechanical jack of the instant invention shown in a retracted position.
FIG. 1A is an enlarged view of the mechanical jack of FIG. 1 showing a rod passing through a guide and a latch unengaged with the rod.

Looking more particularly to the drawings, there is shown in FIG. 1 a preferred embodiment of a mechanical jack which is generally indicated at 10, for lifting and for supporting an object, according to a preferred embodiment of the present invention.

FIG. 1 is a right side perspective view of a preferred embodiment of a mechanical jack of the instant invention shown in a retracted position.

As seen in FIG. 1, the mechanical jack 10, has a lifting portion with lifting means for lifting an object and a supporting portion with supporting means for supporting the lifted object. Mechanical jack 10 is universal in that it can be used to lift and to support various objects such as, but not limited to, a snow plow blade, a boat, a sofa, a desk, a small building, a snowmobile, an aircraft, a filing cabinet, a table, a stove and other loads. It is understood that the object(s) referred to herein are generally indicated at 90, in phantom, as best seen in FIGS. 5–9. Although only one application of the mechanical jack 10 is described and shown in FIGS. 5–9, herein, namely for use in assisting with the installation of a snow plow blade 90 to a vehicle 100, it is understood that a large variety of applications are suited for the instant invention without departing from the scope of the instant invention as disclosed and claimed herein.

The lifting means of the mechanical jack 10 includes a lever 12 having a first end 14 and a second end 16, a base 18 and a fulcrum 20 disposed between the lever 12 and the base 18. Preferably, a boss 26 is disposed on the lever 12 between the first end 14 and the second end 16. The boss 26 is pivotally attached to the fulcrum 20 with a pivot pin 52 and retained with a clip 54 and the fulcrum 20 is fixedly attached to the base 18. For a particular application, boss 26 may be positioned at various locations along the lever 12 near the second end 16. Alternately, it is understood that the fulcrum 20 may be adapted to be pivotally attachable directly to the lever 12. Although not necessary for operation, the base 18 may have, for convenience, a plurality of rollers 70 thereon and the base 18 may also have a base plate 72 for additional strength. A yoke 28 is disposed on the second end 16 of the lever 12 and a pry member 30 is disposed on the yoke 28. Although not necessary, the pry member 30 may have a no-mar surface such as rubber or nylon.

The supporting means of the mechanical jack 10 includes a post 22 pivotally attached to the lever 14 arid a rod 24 movably disposed between the post 22 and the lever 14 and the supporting means cooperating with the lifting means. The post 22 is pivotally attached to the yoke 28 near the pry member 30. The rod 24 has a first member 32 movably attached to the post 22 and a second member 34 being free to move in a linear direction. A guide 36 is disposed on the lever 14 near the first end 14 of the lever 14 for allowing the rod 24 to freely pass therethrough. A latch 38, to engage and to disengage the second member 34 of the rod 24, and the latch 38 being disposed on the lever 14 in close proximity to the guide 36 and cooperating with the guide 36 and with the rod 24 and the movement of the second member 34 of the rod 24 being restricted by the guide 36 and releasably retained by the latch 38.

The post 22 and the fulcrum 20 are disposed in a generally orthogonal spaced relationship with respect to each other and the lever 12, the base 18 and the post 22 defining an angular shape when the mechanical jack 10 is in a retracted position as shown in FIG. 1.

The above mentioned cooperation between the lifting means and the supporting means is best understood by understanding the operation of the mechanical jack 10 by referring to FIGS. 1–9 and FIGS. 1A and 2A.

Figure 2A:
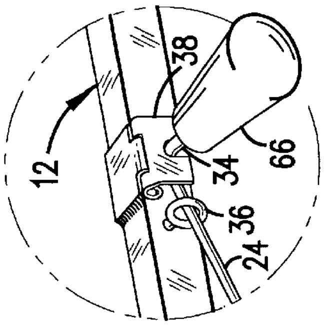
FIG. 2A is an enlarged view of the mechanical jack of FIG. 2 showing the rod passing through the guide and the latch engaged with a second member of the rod.
Figure 2:
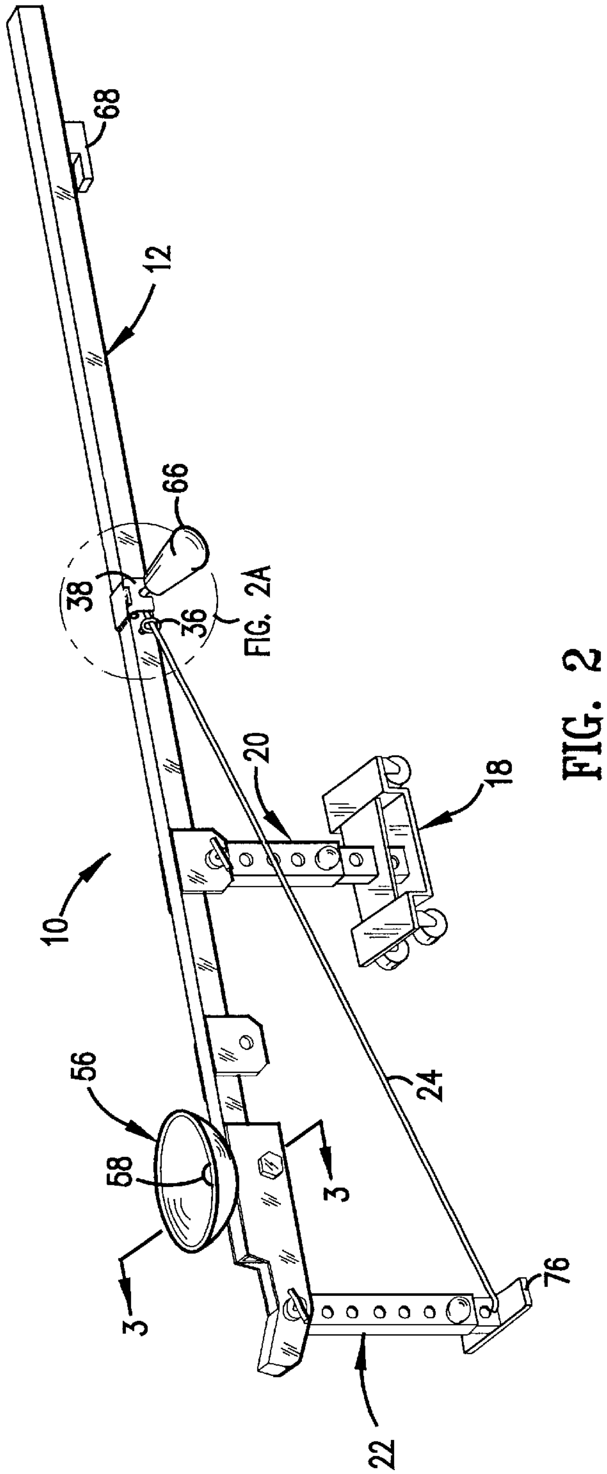
FIG. 2 is a right side perspective view of a preferred embodiment of a mechanical jack of the instant invention of FIG. 1 shown in a fully extended position.

The stated cooperation occurs beginning with the mechanical jack 10 in a retracted position as shown in FIG. 1 and when the lifting means is activated by placing the pry member 30 under an object 90, (see FIG. 7), which is to be lifted and the first end 14 of the lever 12 is forcefully urged in a downward direction toward the ground when the object 90 begins to lift. This operation can be done by the hand of a user. Simultaneously, the supporting means is operatively responsive to the lifting means via the movement of the lever 12 whereby the rod 24 slides through the guide 36 past the latch 38, as best understood from viewing FIG. 1A. During the lifting operation, the post support 76 of the post 22 slides along the ground and the post 22 gradually increasing in height until the second member 34 of the rod 24 is engaged by the latch 38, as best seen in FIG. 2A, and the mechanical jack 10 as seen in FIG. 2 is in a fully extended position at which time the object 90 (see FIG. 8) is supported. The post 22 and the fulcrum 20 are disposed in a linear vertical spaced relationship with respect to each other when the mechanical jack 10 is in the fully extended position. The positive engagement of the latch 38 on the second member 34 prevents the rod 24 from unwanted movement in a direction toward the first end 14 of the lever 12 when the object 90 is being supported by the post 22 so that the object 90 remains stationary.

To lower the supported object 90, the above procedure is reversed. The latch 38, being hinged, is manually disengaged from the second member 34 allowing the rod 24 to once again freely move therethrough the latch 38 as seen in FIG. 1A. The user may hold the second member 34, which preferably has a handle 66 for ease of operation thereon, while slowly lowering the object 90 until the mechanical jack 10 is returned to the initial retracted position of FIG. 1.

Figure 3:
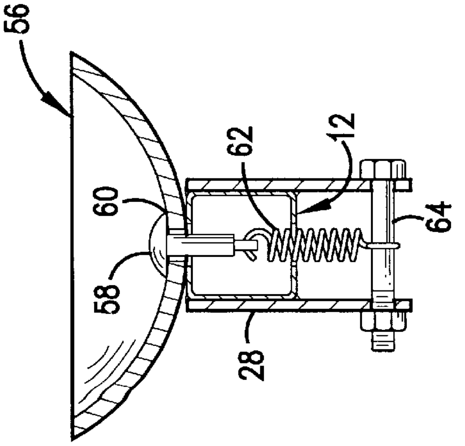
FIG. 3 is a partial cross sectional view showing the details of the aligning means of a cup member taken along line 3—3 of FIG. 2.

Although not necessary for the operation of the mechanical jack. 10 for most applications, but to make the mechanical jack 10 even more useful, a cup member 56 may be disposed on the lever 12 near the second end 16 of the lever 12. The cup member 56 facilitates lifting objects 90 which are inconvenient or difficult to lift with the pry member 30 which may have, for example, projections or irregular surfaces which would normally slip off the pry member 30 when being lifted. The cup member 56, preferably has aligning means to allow the cup member 56 to adequately capture the projections or irregular surfaces and to compensate for misalignment and to thereby provide a safe way to lift such objects 90. For instance, an object 90 in the form of a snowmobile may have a ball-like projection for which the cup member 56 would be well suited to lift. As shown in FIG. 3, the aligning means for the cup member 56 includes a stud 58 disposed on a central portion 60 thereof, a spring 62 attached at one end to the stud 58 and to a bolt 64 which is threadably secured to the yoke 28 of the lever 12. The cup member 56 being spring loaded is permitted to self align when in operation. Alternately, the cup member 56 may be fixed to the lever 12 without the need for the aligning mean sin another version of the mechanical jack 10.

Figure 5:
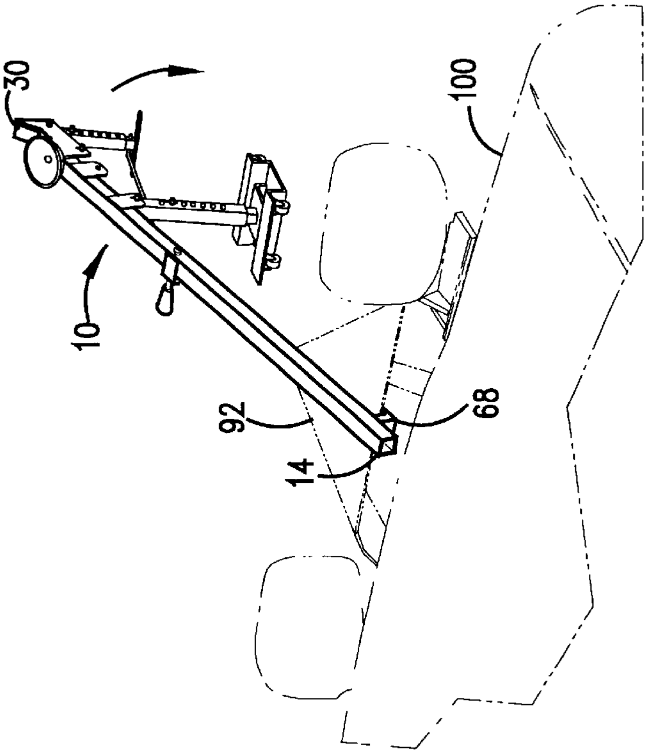
FIGS. 5 to 9 show one of a variety of applications for the mechanical jack in use for assisting in the attachment of an object such as a snow plow blade to a "V" plate mounted on a vehicle and for lifting and for supporting the snow plow blade. The snow plow blade, the "V" plate and the vehicle are shown in phantom.
Figure 6:
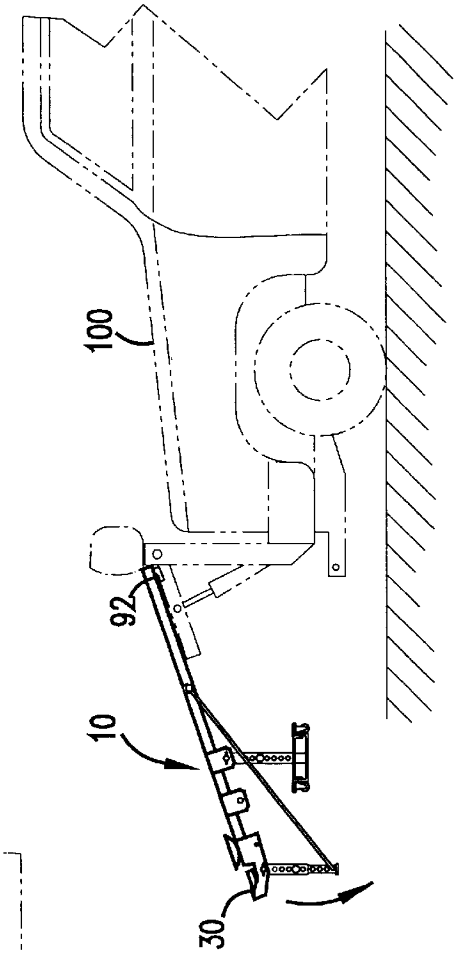
Figure 8:
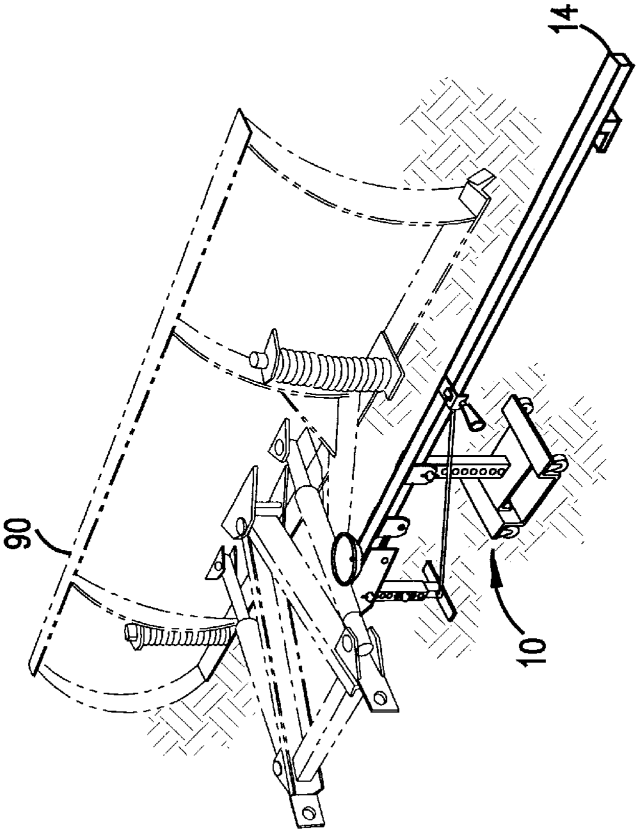
Figure 7:
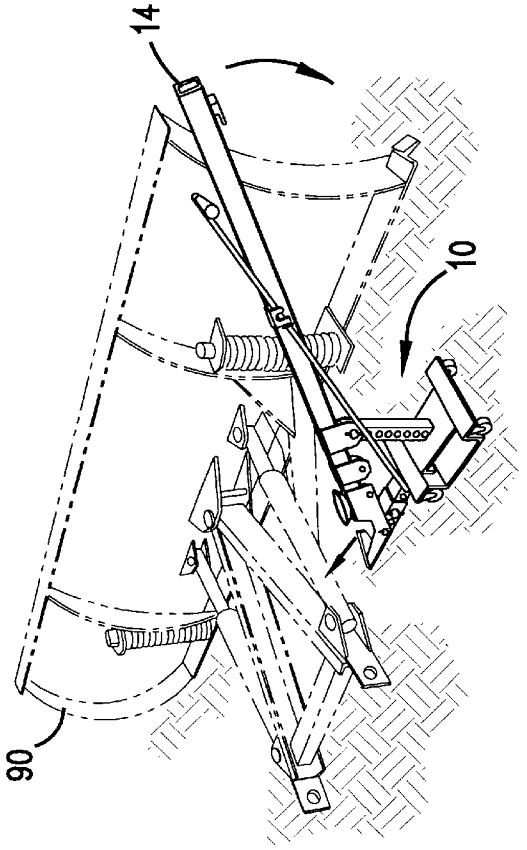
Figure 9:
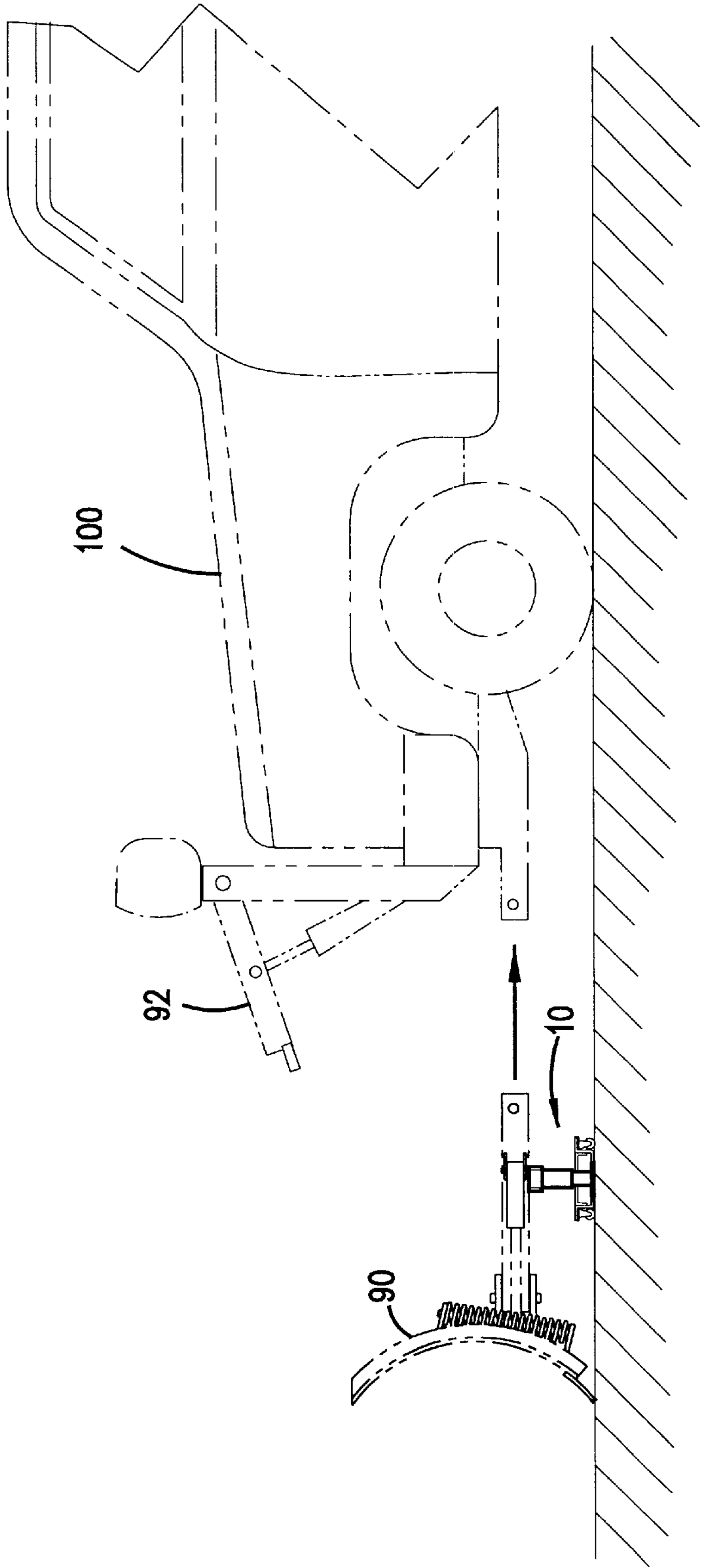

Another feature of the mechanical jack 10 is that a clasp 68 may be disposed near the first end 14 of the lever 12 for use for assisting in the attachment of an object 90 such as a snow plow blade to a "V" plate 92 mounted on a vehicle 100 as best seen in FIGS. 5 to 9. As seen in FIGS. 5 and 6, the clasp 68, in this example, is removably attached to the "V" plate 92 which is mounted on the vehicle 100 with the mechanical jack 10 being suspended in the air. With the pry member 30 acting as a 'handle' in a 'reversed position' from normal use as previously discussed, the pry member 30 is urged downward toward the ground while being opposed by a hydraulic cylinder on the vehicle 100 until the "V" plate 92 is positioned in a manner sufficient to connect the snowplow blade thereto with a chain. The mechanical jack 10 in this function, acts as a pry to urge the "V" plate 92 into the desired position. After that is accomplished, the mechanical jack 10 may be used in the normal manner and may be used to lift and to support the object 90 which is, in this example, the snow plow blade. With the snow plow blade lifted and supported, to mount the snow plow blade on the vehicle 100, the vehicle 100 having a corresponding mating component thereon, is driven to and aligned with the supported snow plow blade (as seen in FIG. 9) and secured thereto and the operation is completed very easily without the difficulty normally encountered when such a procedure is attempted without the use of the instant invention.

Figure 4:
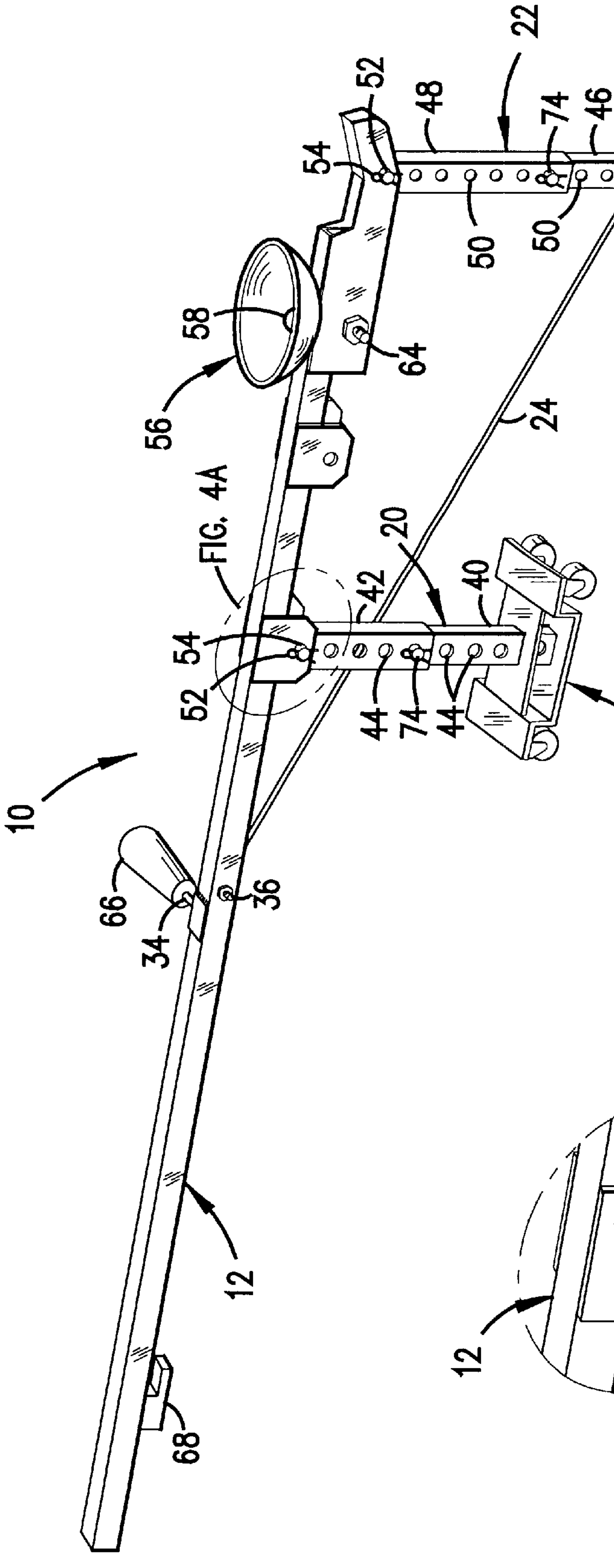
FIG. 4 is a left side perspective view a preferred embodiment of the mechanical jack of FIG. 2 shown in a fully extended position and at an alternate elevated position.
Figure 4A:
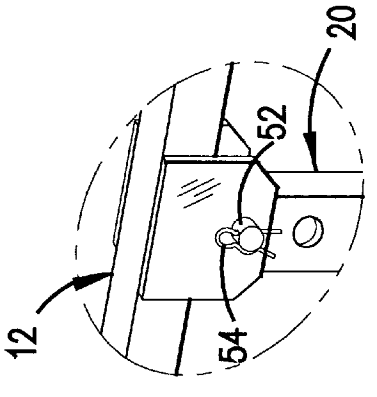
FIG. 4A is an enlarged view of the mechanical jack of FIG. 4 showing a typical clip used with a pivot pin, with a first member of the rod and with a height adjusting pin.

It is understood that the mechanical jack 10 can operate without the need for height adjustment; however, preferably, to make the mechanical jack 10 even more functional, height adjusting means for independently adju ting a vertical height of the fulcrum 20 and the post 22 is provided. FIG. 4 is left side perspective view a preferred embodiment of the mechanical jack 10 of FIG. 2 shown in a fully extended position and at an alternate elevated position. FIG. 4A is an enlarged view of the mechanical jack 10 of FIG. 4 showing the clip 54 used with the pivot pin 52, with the first member 32 of the rod 24 and with a height adjusting pin 74.

A first height adjusting means is disposed on the fulcrum 20 for adjusting a first vertical height of the fulcrum 20 to facilitate lifting the object 90. The fulcrum 20 has a first inner portion 40 cooperating with a first outer portion 42 in a telescopic manner and the first inner portion 40 and the first outer portion 42 each have a first plurality of holes 44 thereon for receiving the height adjusting pin 74 therethrough to selectively maintain the first vertical height. The adjusting pin 74 has the clip 54 for retaining the adjusting pin 74 in place.

A second height adjusting means. is disposed on the post 22 for adjusting a second vertical height of the post 22 to facilitate supporting the object 90. The post 22 has a second inner portion 46 cooperating with a second outer portion 48 in a telescopic manner and the second outer portion 48 and the second inner portion 46 each have a second plurality of holes 50 thereon for receiving the height adjusting pin 74 therethrough to selectively maintain the second vertical height.

According to the teachings of the instant invention disclosed herein, the applicant fabricated a working prototype and has actually reduced the mechanical jack 10 to practice with favorable results. The prototype was fabricated from metal from readily available materials. The lever 12 was constructed of square tubing of about 1½ in (3.8 cm); the boss 26, the yoke 28 and the latch 38, made of metal, were welded to the lever 12. The overall length of the lever 12 and the yoke 28 was about 48 inches (121.9 cm). The base 18 was about 6" (15.2 cm) wide×9" (22.9 cm) long×2" (5.1 cm) in height and was made from a plate about 3⁄16" (0.48 cm) thick. The rod 24 was about 28" (71.1 cm) in length. The fulcrum 20 and the post 22 were each made from square tubing sized to be assembled in a telescoping manner to provide height adjustment. The cup member 56 had aligning means discussed previously and the clasp 68 was welded to the lever 12 near the first end 14 of the lever 12. The rod 24 had the first and second members 32, 34 fabricated by bending. The pry member 30 had a nylon portion to prevent marring of a lifted object 90. Applicant successfully lifted and supported practically every object 90 attempted including, but not limited to, a snow plow blade, a sofa, a snow mobile, a small garden shed, a table and other similar objects. Surprisingly, the applicant discovered that the prototype was capable of handling loads of several hundred pounds and of a wide variety of sizes and shapes with no difficulty.

Surprisingly, the instant invention provides an added advantage and recognizes a problem and adequately and completely addresses an unfulfilled need, in that the mechanical jack 10, in the manner disclosed, in effect, provides a convenient apparatus which allows a user to lift a variety of objects without the use of jack screws, scissors mechanisms or ratchet devices and provides the desired above mentioned advantages and benefits to a user.

It is understood that the mechanical jack 10 may be constructed in a wide variety of sizes, and style variations. One practical advantage of the invention is that it provides a convenient, practical, low cost, mechanical jack 10, which allows a user to conveniently lift and support various objects without the need to purchase separate jacks for a particular application, thereby saving time and money. A further advantage of the invention is that the instant invention is designed for ease of manufacture by standard methods and by using readily available materials.

Of course, a wide variety of further uses and advantages of the present invention will become apparent to one skilled in the art. Also, one skilled in the art will realize that the foregoing discussion outlines the more important features of the invention to enable a better understanding of the instant invention and to instill a better appreciation of the inventor's contribution to the art. It must be clear that the disclosed details of construction, descriptions of geometry and illustrations of inventive concepts are mere examples of possible manifestations of the invention.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed:

1. A mechanical jack comprising:

lifting means for lifting an object including a lever, a base and a fulcrum disposed between said lever and said base; and supporting means for supporting the object being lifted including a post pivotally attached to said lever and a rod movably disposed between said post and said lever and said supporting means cooperating with said lifting means.

2. The mechanical jack of claim 1 further comprising a boss disposed therebetween a first end and a second end of said lever and said boss pivotally attached to said fulcrum and said fulcrum fixedly attached to said base, a yoke disposed on said second end of said lever and a pry member disposed on said yoke.

3. The mechanical jack of claim 2 wherein said rod has a first member and a second member oriented perpendicular to a longitudinal length of said rod and said second member being disposed in a direction opposite to and parallel to said first member.

4. The mechanical jack of claim 3 wherein said supporting means further comprising a guide for allowing said rod to freely pass therethrough and a latch to engage and to disengage said second member of said rod.

5. The mechanical jack of claim 4 wherein said guide and said latch each disposed on said lever and said latch disposed in close proximity to and cooperating with said guide and with said rod and said latch operatively responsive to said lifting means.

6. The mechanical jack of claim 5 wherein said first member movably attached to said post and said second member being free to move in a linear direction and the movement of said second member being restricted by said guide and said second member releasably retained by said latch.

7. The mechanical jack of claim 6 further comprising first height adjusting means disposed on said fulcrum for adjusting a first vertical height of said fulcrum to facilitate lifting the object.

8. The mechanical jack of claim 7 wherein said first height adjusting means comprises said fulcrum having a first inner portion cooperating with a first outer portion in a telescopic manner and said first inner portion and said first outer portion each having a first plurality of holes thereon for receiving a height adjusting pin therethrough to selectively maintain the first vertical height.

9. The mechanical jack of claim 8 further comprising second height adjusting means disposed on said post for adjusting a second vertical height of said post to facilitate supporting the object.

10. The mechanical jack of claim 9 wherein said second height adjusting means disposed on said post further comprises said post having a second inner portion cooperating with a second outer portion in a telescopic manner and said second outer portion and said second inner portion each having a second plurality of holes thereon for receiving a height adjusting pin of said second means therethrough to selectively maintain the second vertical height.

11. The mechanical jack of claim 10 further comprising a cup member disposed on said lever near said second end of said lever to enhance the lifting capability and versatility of said mechanical jack.

12. The mechanical jack of claim 11 further comprising a clasp disposed near said first end of said lever.

13. The mechanical jack of claim 12 wherein said cup member further comprising aligning means so that the object to be lifted can be adequately and safely positioned and seated thereon said cup member.

14. The mechanical jack of claim 13 wherein said aligning means of said cup member includes a stud extending from said cup member and through said lever, a spring attached to said stud and to a bolt attached to said yoke.

15. The mechanical jack of claim 14 wherein said supporting means further includes a handle disposed on said second member of said rod.

16. The mechanical jack of claim 15 wherein said base has a plurality of rollers thereon.

17. A mechanical jack for lifting and for supporting an object, said mechanical jack comprising:

a base;

a lever having a first end and a second end;

a fulcrum disposed between said lever and said base;

a boss disposed on said lever between said first end and said second end;

said boss pivotally attached to said fulcrum and said fulcrum fixedly attached to said base;

a yoke disposed on said second end of said lever;

a pry member disposed on said yoke;

a post pivotally attached to said yoke near said pry member;

a rod having a first member movably attached to said post and a second member being free to move in a linear direction;

a guide disposed on said lever near said first end of said lever for allowing said rod to freely pass therethrough;

a latch, to engage and to disengage said second member of said rod, and said latch disposed on said lever in close proximity to said guide and cooperating with said guide and with said rod and the movement of said second member of said rod being restricted by said guide and releasably retained by said latch; and height adjusting means for independently adjusting a vertical height of said fulcrum and of said post.

18. A method for making a mechanical jack comprising the steps of:

providing a base;

providing a lever having a first end and a second end;

providing a fulcrum disposed between said lever and said base;

providing a boss disposed on said lever between said first end and said second end;

pivotally attaching said boss to said fulcrum and fixedly attaching said fulcrum to said base;

disposing a yoke on said second end of said lever;

providing a pry member and disposing said pry member on said yoke;

pivotally attaching said post to said yoke near said pry member;

providing a rod having a first member movably attached to said post and a second member being free to move in a linear direction;

providing a guide disposed on said lever near said first end of said lever for allowing said rod to freely pass therethrough;

providing a latch, to engage and to disengage said second member of said rod;

disposing said latch disposed on said lever in close proximity to said guide and cooperating with said guide and with said rod and the movement of said second member of said rod being restricted by said guide and releasably retained by said latch; and providing height adjusting means for independently adjusting a vertical height of said fulcrum and of said post.

19. The method for making a mechanical jack of claim 18 further comprising the step of providing a clasp disposed near said first end of said lever.

20. The method for making a mechanical jack of claim 19 further comprising the steps of providing a cup member and disposing said cup member on said lever near said second end of said lever to enhance the lifting capability and versatility of said mechanical jack.

21. The method for making a mechanical jack of claim 20 further comprising the step of providing said cup member with aligning means including a stud extending from said cup member and through said lever, a spring attached to said stud and to a bolt attached to said yoke so that the object to be lifted can be adequately and safely positioned and seated thereon said cup member.

22. A method for using a mechanical jack having lifting means for lifting an object chosen from the group consisting of a sofa, a desk, a small building, a snow plow blade, a boat, a snowmobile, an aircraft, a filing cabinet, a stove and a table; said mechanical jack including a lever, a base and a fulcrum disposed between said lever and said base, and supporting means for supporting the object being lifted including a post pivotally attached to said lever and a rod movably disposed between said post and said lever and said supporting means cooperating with said lifting means comprising the steps of:

positioning a pry member of said lever under the object to be lifted;

moving said lever about said fulcrum thereby causing the object to be lifted, and, simultaneously while the object is being lifted, said rod and said post being cooperatively responsive to said lever movement until said post is vertically oriented beneath said pry member whereby said post supports the lifted object.

* * * * *